Figure 1:
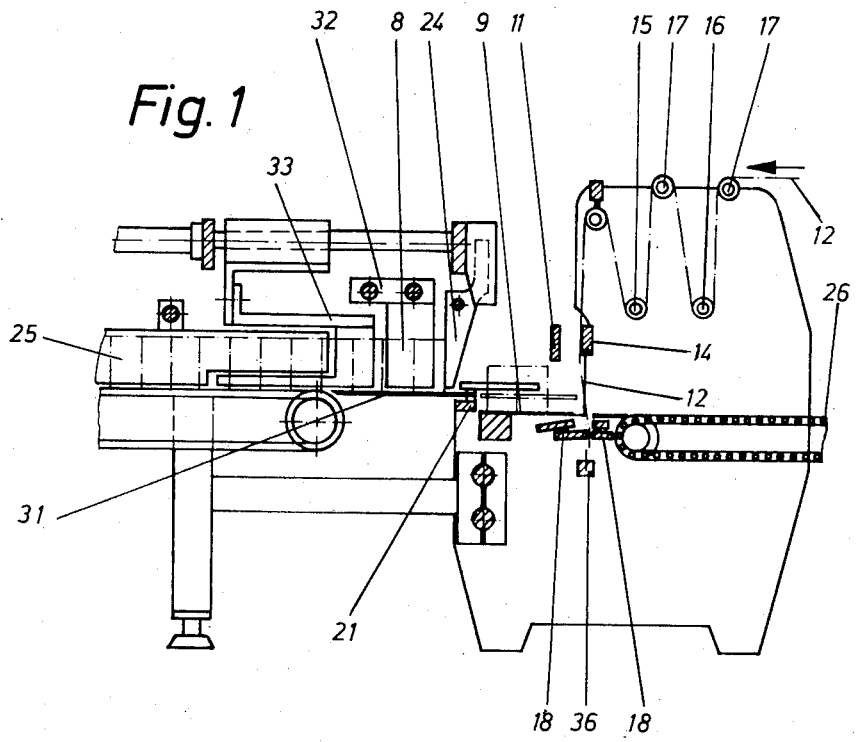

United States Patent [19]
Bauer

[11] 3,807,128
[45] Apr. 30, 1974

[54] PACKAGING MACHINE

[76] Inventor: Everhard Bauer, Hudeweg 2, 479 Paderborn, Germany

[22] Filed: Apr. 24, 1972

[21] Appl. No.: 246,527

[52] U.S. Cl............................ 53/159, 53/48, 53/248, 53/247
[51] Int. Cl............................................. B65b 35/40
[58] Field of Search........ 53/48, 247, 248, 782, 159

[56] References Cited
UNITED STATES PATENTS

| | | | |
|---|---|---|---|
| 3,507,089 | 4/1970 | Mizelle et al. | 53/159 K |
| 3,481,107 | 12/1969 | Andblad et al. | 53/159 |
| 3,008,563 | 11/1961 | Carter | 53/248 K |
| 2,972,842 | 2/1961 | Hitchcock | 53/247 K |
| 1,824,432 | 9/1931 | Hendry | 53/159 K |

Primary Examiner—Andrew R. Juhasz
Assistant Examiner—W. D. Bray
Attorney, Agent, or Firm—Fleit, Gipple & Jacobson

[57] ABSTRACT

An apparatus is provided which serves to separate loose items to be packaged, which are continuously supplied, and to combine the items in sets. In that apparatus, a conveyor continuously feeds the items to be packaged. Distributing mechanisms are provided, which distribute the items to be packaged to a plurality of parallel paths of travel, which are separated by guides. These distributing mechanisms comprise abutment fingers, which obstruct the items to be packaged before separated sets of items are supplied to a machine for wrapping the sets with plastic material sheeting. A set-forming device is provided in the plane of the feeding conveyor and divides the continuously supplied items to be packaged into the desired, separate sets of items to be packaged. The device comprises a movable shifting device, by which the items to be packaged in a unit are laterally shifted from the feeding paths of travel so as to separate the items. The shifting device in its shifted position blocks the flow of items on the feeding paths of travel whereas the shifted items are so offset in the shifted position of the shifting device that they are no longer obstructed by the abutment fingers, which are disposed laterally of and define paths of travel between the abutment fingers. A first pusher is provided, which pushes the set of items to be packaged onto a lowerable platform against a forward stop. The items are confined on the platform by lateral guides so that the items are located relative to each other on the platform. The platform is adapted to be lowered to a second plane, in which the items are no longer obstructed by the forward stop. A second pusher pushes the set of items under the stop into a machine for wrapping the set with plastic material sheeting.

12 Claims, 4 Drawing Figures

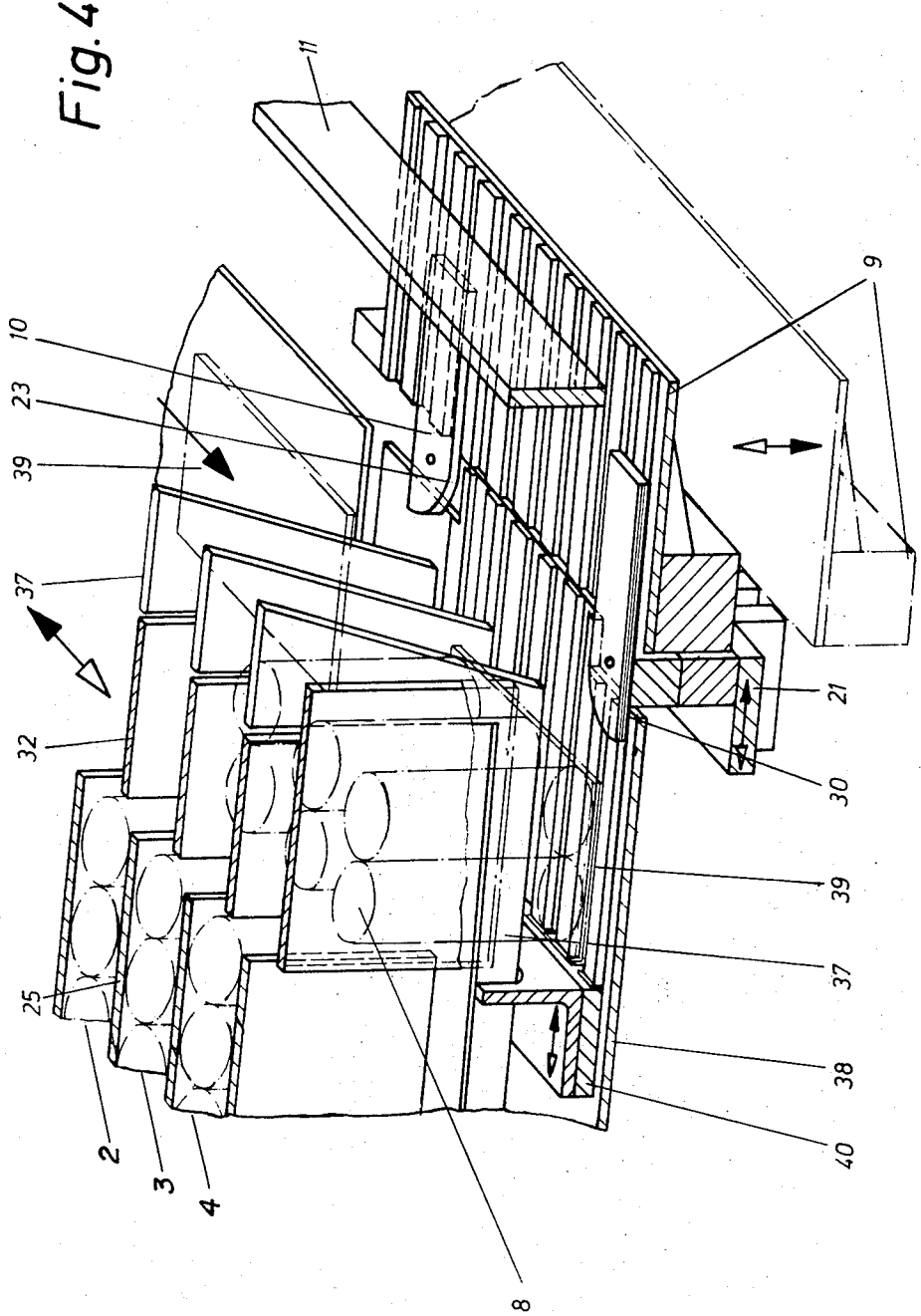

PACKAGING MACHINE

This invention relates to an apparatus for separating loose items to be packaged, which are continuously supplied, and to combine said items in sets. In the apparatus a conveyor continuously feeds the items to be packaged and distributing means are provided, which distribute the items to be packaged to a plurality of parallel paths of travel, which are separated by guides. The distributing means comprises abutment fingers, which obstruct the items to be packaged before separated sets of items are supplied to a machine for wrapping the sets with plastic material sheeting.

In packaging operations, the items which are individually delivered by packaging or filling machines must be combined in sets so that units consisting of a plurality of items can be offered for sale.

Lump items, such as bottles, tubes, cans or other packages are usually individually discharged from the filling or packaging machines and are then delivered by conventional conveyors to succeeding packaging stations, in which the items are combined in larger packages, which are offered for sale. Specifically, the individual items are held together by transparent shrunk-on sheeting in larger packages, in which the individual items remain visible from the outside.

The feeding of sets of items to a machine for wrapping said sets with plastic material sheeting, which is subsequently shrunk to form a package, is not highly problematic because the individual items are held together on a supporting tray or carton provided with an upstanding rim and the items cannot move or fall apart while being wrapped with plastic material sheeting.

On the other hand, when loose items combined in sets are to be packaged in shrunk-on sheeting, it is difficult to feed the machine for wrapping with plastic material sheeting intermittently and at a high rate with separate sets of items which were originally continuously fed because the individual items of a set may move or fall apart during the feeding or wrapping of the set.

For this reason it is an object of the invention to provide an apparatus in which continuously supplied, loose items are combined in sets to be packaged and the sets are intermittently fed to a machine for wrapping with plastic material sheeting, which is subsequently shrunk to form a package. Another object of the invention resides in that the machine for wrapping items with plastic material sheeting is so arranged in the packaging line that high-grade packages of shrunk-on sheeting can be made at a high rate.

It is known in the art to provide liftable boxes, in which continuously supplied, loose items are combined, after which the boxes are lifted so as to feed the items to the succeeding packaging machines. In such arrangements the items must be lifted approximately to the extent of their entire height. The known feeding from below is complicated and expensive and does not permit of a formation of shrunk-on sheeting packages at a satisfactorily high rate. For this reason it is a further object of the invention to avoid the disadvantages of known apparatus.

In an apparatus of the kind previously defined, these objects are accomplished according to the invention in that a set-forming device is provided in the plane of the feeding conveyor which divides the continuously supplied items to be packaged into desired, separate sets of items to be packaged. The device comprises a movable shifting device, by which the items to be packaged in a unit are laterally shifted from the feeding paths of travel so as to separate the items, and in its shifted position blocks the flow of items on the feeding paths of travel, so that the shifted items are so offset in the shifted position of the shifting device that they are no longer obstructed by the abutment fingers, which are disposed laterally of and define paths of travel between the abutment fingers. A first pusher device is provided, in the invention which pushes the set of items to be packaged onto a lowerable platform against a forward stop, with the items being confined on the platform by lateral guides so that the items are located relative to each other on the platform. The platform is adapted to be lowered to a second plane, in which the items are no longer obstructed by the forward stop, and a second pusher pushes the set of items under the stop into a machine for wrapping the set with plastic material sheeting.

In certain cases it is desired or required in view of the nature of the items to be packaged that these items are placed on a support, which reinforces the set of items, before the items are wrapped with sheeting which is subsequently shrunk. For this purpose, a flat carton or a plastic material support is pushed under the set of items before the shrunk-on package is formed. Such supports will reinforce the sets of items during the distributing operations and when they are stacked.

In a preferred embodiment of the invention, the products are fed along rails consisting of narrow webs. In this embodiment abutment fingers are disposed at the forward ends of the webs, and a device is provided which pushes a flat support under the rails adjacent to the shifting device. The shifting device shifts the items in such a manner that the same fall on the support in the guide paths formed between the rails, and the set of items is then pushed by the first pusher onto the lowerable platform. The flat supports consisting of carton or plastic material are much less expensive than the known trays conventionally used to combine and stabilize items to be packaged.

It is also desirable to provide for an adjustment of the lateral guides so as to combine items in sets of different size. The platform can preferably be lowered only to such an extent that the items can just move under the stop, which extends transversely to the direction of travel, to the machine for wrapping the sets with plastic material sheeting. The machine for wrapping the sets with plastic material sheeting suitably forms a unit with the lowerable platform in such a manner that the tightly stretched sheeting of plastic material forms a rear boundary, which constitutes a backing for the items to be packaged when the platform has been lowered so that the stop is no longer effective. The plastic material sheeting is suitably held below the lowermost point of the lowerable platform by a gripper. When the platform is being lowered, the pusher pushes the set of items to be packaged into the wrapping machine against the resistance presented by the tightly stretched plastic material sheeting. A pulling bar which can be lowered applies and holds the plastic material sheeting about the set of items until a welding device has formed a horizontally extending seam weld, and a severing knife has severed the set of items wrapped by the plastic material sheeting from the web of sheeting. The resulting package is then fed in known manner to a shrinking tunnel.

Figure 2:
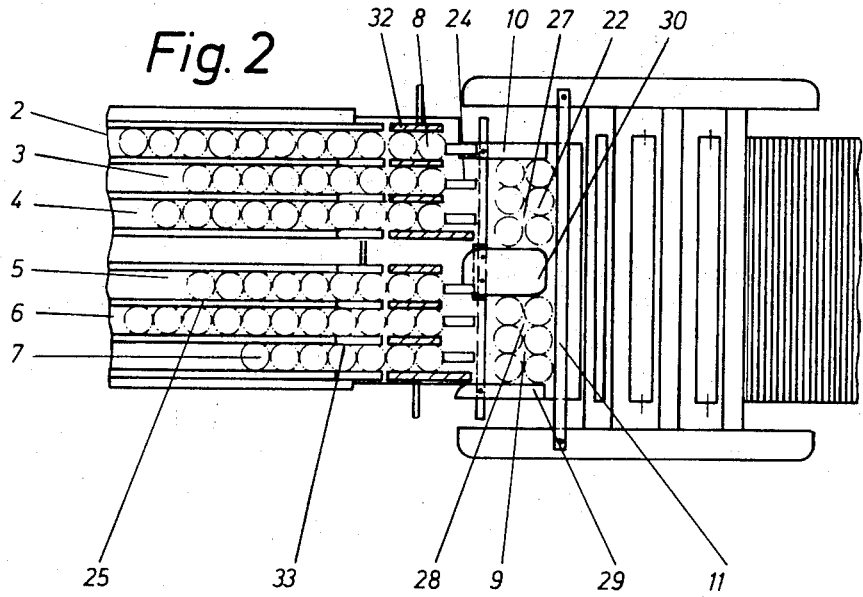

Illustrative embodiments and additional features of the invention will be explained more fully hereinafter with reference to the drawing, in which FIG. 1 is a side elevation showing the platform which can be lowered and which connects the feeding device to the wrapping machine, FIG. 2 is a top plan view showing the apparatus of FIG. 1.

Figure 3:
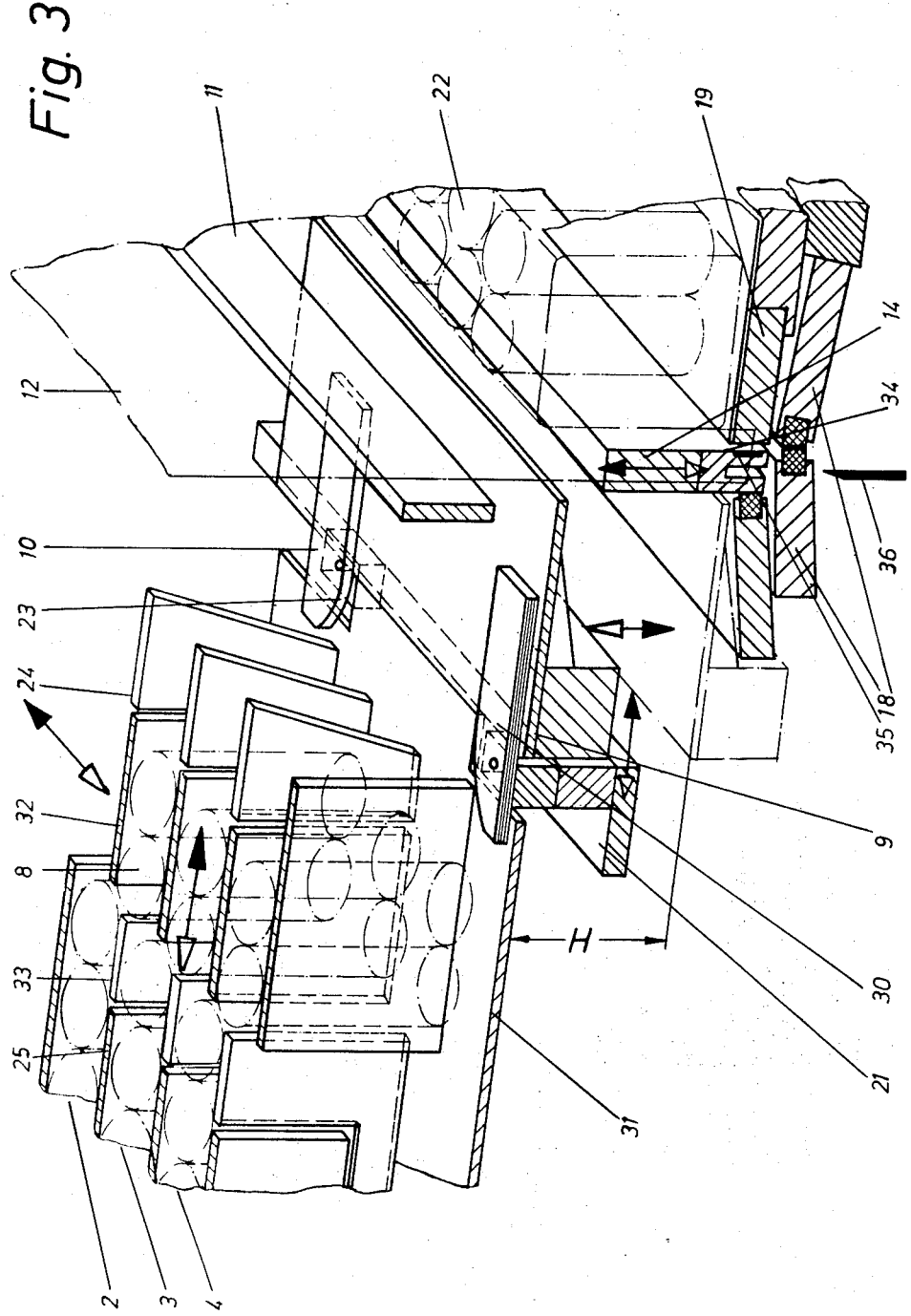

FIG. 3 is an enlarged perspective view showing the lowerable platform with set-forming and shifting means and FIG. 4 is a view similar to FIG. 3 showing another embodiment of the invention.

A conveyor, not shown, is provided, by which spaced apart, loose items 8 to be packaged are individually supplied to a distributing device, not shown, and by which the items 8 are distributed to the several paths of travel 2, 3, 4, 5, 6, 7. The succeeding items push the preceding ones ahead so that there is no need for driven conveying means in the feeding paths of travel 2 to 7, which are formed on a smooth support 31, on which the items 8 are shifted. The items on adjacent feeding paths are separated by guide rails 25 and are obstructed by abutment fingers 24.

When the items have been obstructed, they are combined in sets and the sets are separated by a shifting device 32, by which the items are laterally shifted. The shifting device is shiftable in the direction of the double arrows (FIG. 3). Those items which succeed the items of a set which has been separated are blocked by the shifting device 32 when the same has been laterally shifted to such an extent that its guides are disposed approximately in the middle of respective feeding paths 2, 3, 4 whereas in the initial position of the shifting device its guides are aligned with the guide rails 25. By the lateral shifting of the shifting device 32, the items of the set are moved to a position from which they can be pushed to the lowerable platform 9 by a pusher 33. In its initial position, the shifting device 32 is aligned with the guide rails 25 and the upstanding parts of the pusher 33 to form means which define the feeding paths for the items 8 as far as to the latches 24. When the shifting device 32 has been shifted, its guide means are aligned with the abutment fingers 24 to confine the separated items, which can now be pushed to the lowerable platform by the operation of the pusher 33.

In its upper position, the lowerable platform 9 lies in the plane on which the items 8 have been fed. The operation of the shifting device 32 results in a lateral shifting of the items 8 to form a set of two rows of three items each. This set can then be pushed onto the lowerable platform 9 by an operation of the pusher 33.

As is shown by way of example in FIG. 2, two sets of six items can be formed at the same time. The size of each set may be changed as desired by a change of the number of items in each row and of the number of rows.

The items of each set are pushed together on the lowerable platform as they are released from the guides which have previously separated the items of different guide paths. In the embodiment shown by way of example, the items 8 are pushed together as soon as they leave the spaces defined by the abutment fingers 24 and are pushed onto the platform 9 past the lateral guides 10 having oblique receiving edges which define a funnellike entrance. The items are located on the platform 9 by the lateral guides 10, 30, 29 and the forward stop 11 so that the loose items cannot move apart. The pusher 33 returns to its initial position when it has pushed the items 8 onto the platform where the items are given the designation 22. Thereafter, the shifting device 32 also returns to its initial position. The succeeding items 8 enter the set-forming device and are obstructed by the abutment fingers 24. During the return of the pusher 33, the platform 9 is lowered so that platform items 22 of the set can move under the lower edge of the stop 11. The distance H by which the platform 9 can be lowered must be at least a distance so that the items 22 can move under the stop 11. When the platform 9 has been lowered, a second pusher 21 provided with lateral guides 10, 29, 30 pushes the set of, e.g., six items against the tightly stretched sheeting 12 of plastic material in the succeeding wrapping machine. The second pusher 21 pushes the sets of items into the machine to such an extent that the lowerable pulling bar 14 is disposed before the forward end of the set of items which have been fed.

Because the obstructed items to be packaged, which may consist, e.g., of six cans in two rows of three cans, are laterally shifted, the pusher 33 can simply push the set of items to be packaged onto the lowerable platform 9. That arrangement enables the formation of sets of items to be packaged at a high rate.

To increase the output rate, a plurality of sets of items may be moved along parallel paths 27, 28 (FIG. 2) to the machine for wrapping the sets with plastic material sheeting.

The lateral boundaries 10, 29 together with the stop 11 and with any intermediate boundaries 30 form exactly defined boxes, in which the loosely fed items are located relative to each other so that the shrinking of plastic material sheeting around the sets results in compact packages. To facilitate the entrance of the items and to ensure that the items to be packaged, which have previously moved on paths separated by the guide rails, are pushed together, the lateral guides are formed with oblique receiving edges 23, which define a funnel-like entrance.

The lateral guides 10, 30, 29 are adjustable to enable an adjustment of the separating means to items 8 having different sizes or to sets of different sizes. The stop 11 is also adjustable in height.

FIG. 4 shows an apparatus in which the sets are additionally stabilized in that flat carton plates or molded supports of plastic material are supplied in a lateral direction. The plastic material sheeting is subsequently wrapped and shrunk around these supports and the items supported thereby. The individual items 8 to be packaged move along their paths 2, 3, 4 into engagement with abutment fingers 37, which at their forward end are upwardly angled to form latches. Guide paths for the items to be packaged are defined by the narrow abutment fingers 37 and the items fall into said guide paths when the items have been shifted. As soon as the flat support 39 has been laterally moved in the direction of the arrow and placed on the platform under the abutment fingers, the shifting device 32 laterally shifts the separated items to be packaged so that they fall in the guide paths defined by the guide rails onto the support 39 and the abutment fingers 37 now form lateral boundaries. The supports 39 are fed in known manner from a magazine. After the shifting device 32 has been laterally shifted, the items fall by gravity into the spaces between the abutment fingers 37 and on the support 39 which is in receiving position. The resulting set of items to be packaged as well as the support 39 are pushed from the deck 38 to the lowerable platform 9 by a comblike pusher 40, which is movable in the direction of the double arrow. Ribs are arranged on the deck 38 and define grooves, which receive the comblike pusher 40 so that the support will be reliably moved together with the set of items.

The pusher 21 which pushes the items from the lowered platform 9 into the machine for wrapping the items with plastic material sheeting is also comb-shaped on its underside so that the items can be reliably pushed together with their support 39 from the lowerable platform, which is also provided with webs.

In the machine for wrapping the items with plastic material sheeting, an adequate length of plastic material sheeting is stored over the rollers 15, 16 mounted on rocker arms and over stationary rollers 17 so that an adequate supply of plastic material sheeting for wrapping the items is available when the pulling bar 14 has been lowered before the forward edge of the packaging unit which is introduced into the wrapping machine. The pulling bar 14 is provided at its forward edge 34 with an elastic pressure rib 35, which cooperates with a welding jaw 19 when the pulling bar is in its lower position. The pulling bar 14 feeds at the same time a new end of the plastic material sheeing 12 to the gripper jaws 18 when the previously retained end has been welded and the sheeting of plastic material has been severed from a swung-in severing knife behind the seam weld. The package 22 comprising the items loosely held together by the wrapper is then supplied from the wrapping machine to a shrinking tunnel, not shown, by the conveyor 26.

The feeding to the separating and shifting device need not be along a straight line but may be effected in a lateral direction at an angle.

I claim:

1. An apparatus for separating loose items to be packaged, which are continuously supplied, and to combine said items in sets, in which apparatus a conveyor continuously feeds the items to be packaged and distributing means are provided, which distribute the items to be packaged to a plurality of parallel paths of travel, which are separated by guides, said distributing means comprising abutment fingers, which obstruct the items to be packaged before separated sets of items are supplied to a machine for wrapping said sets with plastic material sheeting, characterized in that a set-forming device is provided in the plane of the feeding conveyor which divides the continously supplied items to be packaged into the desired, separate sets of items to be packaged, said device comprising a movable shifting device, by which the items to be packaged in a unit are laterally shifted from the feeding paths of travel so as to separate said items, said shifting device in its shifted position blocking the flow of items on the feeding paths of travel, whereas the shifted items are so offset in the shifted position of the shifting device that they are no longer obstructed by the abutment fingers, which are disposed laterally of and define paths of travel therebetween, a first pusher device is provided, which pushes the set of items to be packaged onto a lowerable platform against a forward stop, the items being confined on the platform by lateral guides so that the items are located relative to each other on the platform, the platform is adapted to be lowered to a second plane, in which the items are no longer obstructed by the forward stop, and a second pusher pushes the set of items under the stop into a machine for wrapping the set with plastic material sheeting.

2. An apparatus according to claim 1, characterized in that the products are fed along rails consisting of narrow webs, and the abutment fingers are disposed at the forward ends of said webs, with a means being provided which pushes a flat support under the rails adjacent to the shifting device, the shifting device shifting the items in such a manner that the same fall on the support in the guide paths formed between the rails, and the set of items is then pushed by the first pusher onto the lowerable platform.

3. An apparatus according to claim 1, characterized in that the guides which laterally confine the set of items on the lowerable platform are carried by the second pusher.

4. An apparatus according to claim 2, characterized in that the support is pushed on a supporting plate formed with longitudinal grooves, and said second pusher the teeth which extend into the grooves.

5. An apparatus according to claim 2, characterized in that the first pusher is comblike and is provided on its upper side with recesses which receive the guide rails along which the items to be packaged are fed so that a pusher is used which is as high as possible.

6. An apparatus according to claim 1, characterized in that a plurality of sets of items which are parallel and separated by guides are formed on the platform.

7. An apparatus according to claim 1, characterized in that the lateral guides are adjustable to combine items in sets of different sizes.

8. An apparatus according to claim 1, characterized in that the platform can be lowered only to such an extent that the items to be packaged are just movable under the stop, which is stationary in the machine.

9. An apparatus according to claim 1, characterized in that the leading items of the set are pushed forward to tightly engage a tightly stretched sheeting of plastic material in the succeeding machine for wrapping the items with plastic material sheeting and this engagement prevents the items from moving apart.

10. An apparatus according to claim 1, including rollers mounted on rocker arms which hold tightly stretched plastic material sheeting available in a quantity which is sufficient to wrap the set of items when a pulling bar is being lowered.

11. An apparatus according to claim 1, including a pulling bar which feeds the plastic material sheeting over the forward end of the set of items to be packaged to a retaining gripper, said pulling bar being provided with an elastic pressure rib on its forward side.

12. An apparatus according to claim 11, including a severing knife to sever the plastic material sheeting.

* * * * *